April 22, 1958 E. E. MAGAT 2,831,834
PROCESS FOR PREPARING POLYAMIDES
Filed May 12, 1951
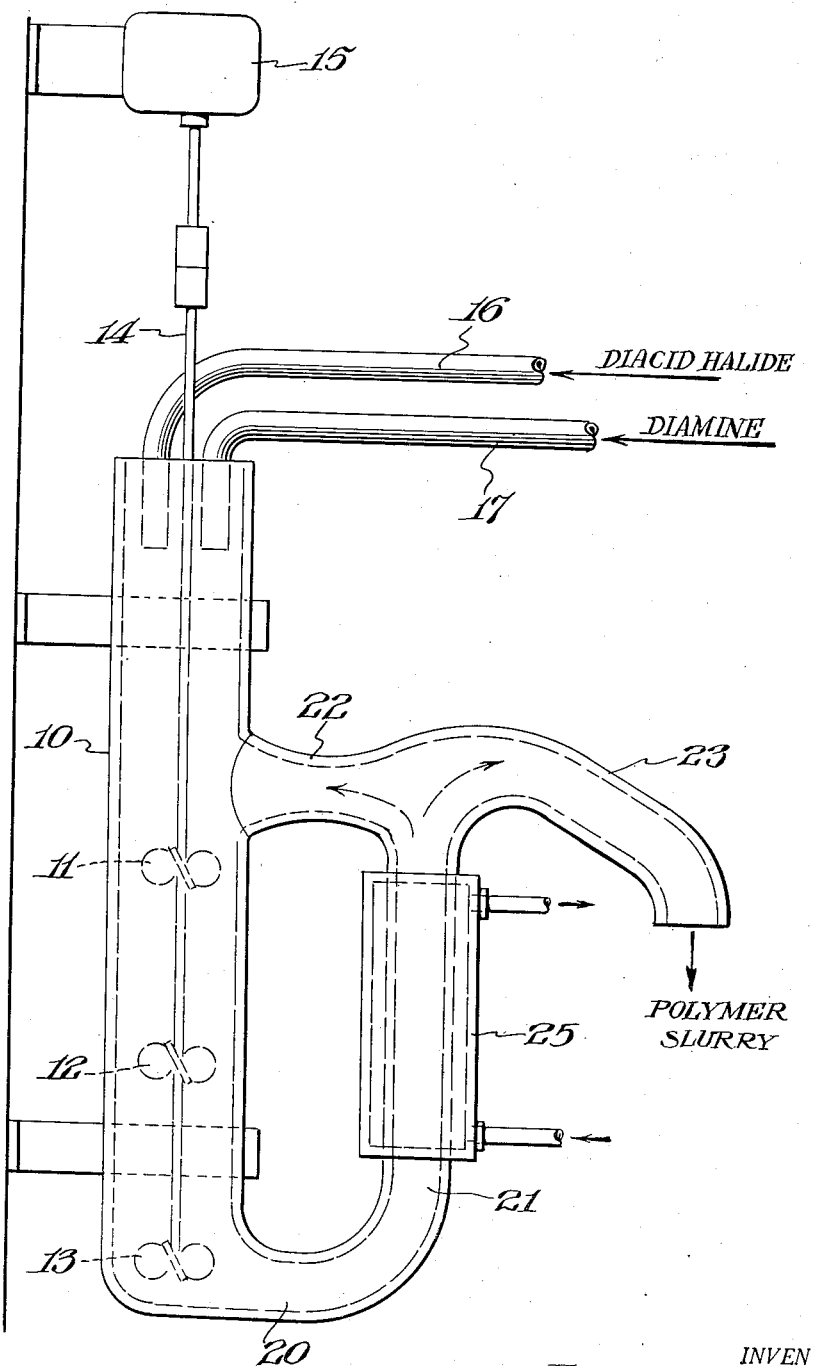
INVENTOR.
Eugene Edward Magat
BY
ATTORNEY.

United States Patent Office 2,831,834
Patented Apr. 22, 1958

2,831,834

PROCESS FOR PREPARING POLYAMIDES

Eugene Edward Magat, Wilmington, Del., assignor to E. I. du Pont de Nemours & Company, Wilmington, Del., a corporation of Delaware Application May 12, 1951, Serial No. 226,065

14 Claims. (Cl. 260—78)

This invention relates to the preparation of polyamides from organic diamines and organic dicarboxylic acid halides and, more particularly, to a process for preparing fiber-forming polyamides by a moderate-temperature interphase condensation polymerization.

It is well known that polyamides may be prepared by reacting, at amide-forming temperatures, organic diamines with organic dicarboxylic acids or amide-forming derivatives of these acids, such as their esters. Representative patents covering this field include Carothers U. S. Patents 2,071,250, 2,071,253, 2,130,523, 2,130,948, and 2,190,770. These patents all disclose that the successful preparation of high molecular weight, fiber-forming polyamides is restricted to high temperature reactions in the range of 150° to 300° C., using pure reactants in substantially equivalent proportions.

Polyamides have also been prepared by the reaction of organic diamines with organic dicarboxylic acid chlorides at lower temperatures, the condensation being carried out with either the pure reactants or in an inert liquid diluent which is a mutual solvent for the reactants, such as benzene. However, these polyamides are of relatively low molecular weight and are, therefore, not useful in the textile field where polyamides normally find their greatest utility. Low molecular weight products result from this reaction even though acid acceptors, such as alkalies, carbonates, or tertiary organic bases, are present in the reaction medium. Only by subsequent heat treatment of these products, for example, at 200° to 250° C. under conditions permitting the rapid removal of volatile materials, has it been possible to prepare fiber-forming polyamides from these reactants. Consequently, the production of polyamides from the dicarboxylic acid halides has been considered to be impracticable.

It is an object of this invention to provide a process for producing fiber-forming polyamides by a reaction of organic diamines with organic dicarboxylic acid halides at moderate temperatures, without the necessity of subsequent heat treatment. It is a further object to provide such a process which has the advantages of using simple equipment and not requiring pure reactants or careful control of proportions. Another object is to provide such a process which is rapid, is readily practiced in continuous fashion, and produces a finely divided product. A still further object is to provide a process suitable for the production of polyamides which cannot be prepared at the high temperatures disclosed in the prior art either because of the instability of the reactants or the instability of the desired polyamide at these temperatures. Other objects will become apparent from the following disclosure and the claims.

It has now been found that the reaction of organic primary and secondary diamines with organic dicarboxylic acid halides proceeds smoothly and rapidly to the formation of fiber-forming polyamides at moderate temperatures when these reactants are brought together in such a way that the reaction zone is at, or is immediately adjacent to, a liquid-liquid interface and most of the molecules of at least one of the intermediates must diffuse through liquid diluent to arrive at the reaction zone. The process for accomplishing this comprises bringing together the diamine in one liquid phase and the acid halide in a second liquid phase immiscible with the first phase, mixing the liquid phases to form a system comprised of two liquid phases such that the diamine and acid halide are in separate phases and at least one of the phases includes a liquid diluent, maintaining the phases in admixture until the desired condensation polymerization has taken place, and then if desired, separating the resulting polyamide. Preferably an intermediate is a liquid under the reaction conditions or is dissolved in a diluent, but one of the intermediates may be a finely divided solid dispersed or suspended in a diluent in which the intermediate is at least partially soluble. The organic dicarboxylic acid halide may be a diacid fluoride, a diacid chloride, a diacid bromide, a diacid iodide, or a mixed diacid halide.

The drawing illustrates a suitable apparatus for carrying out the process in continuous fashion.

The above process may be carried out with a large number of variations, not all of which are equally adaptable to the preparation of each specific polyamide. The broad methods, falling within the purview of this new process and depicted in the examples hereinafter set forth, include the following: (1) non-aqueous systems in which at least one of the intermediates is dissolved or dispersed in a diluent or diluents such that at least two liquid phases are obtained upon the initial mixing, and (2) aqueous systems in which the diamine is dissolved or dispersed in water, or water and another diluent, and in which the diacid halide is undiluted or is dissolved or dispersed in a non-aqueous liquid diluent of such character that on mixing the liquids a system of two liquid phases is obtained initially.

It will be seen that the first broad method encompasses such variations as (a) a diamine dissolved or dispersed in a non-aqueous liquid diluent and reacted with a liquid diacid halide which is substantially insoluble in this non-aqueous diluent, (b) a diacid halide dissolved or dispersed in a non-aqueous liquid diluent and reacted with a liquid diamine which is substantially insoluble in this non-aqueous liquid diluent, (c) a diamine dissolved or dispersed in a non-aqueous liquid diluent and reacted with a diacid halide dissolved or dispersed in a non-aqueous liquid diluent such that the two non-aqueous diluents are immiscible, and (d) either a diamine or a diacid halide dissolved or dispersed in an emulsion of non-aqueous diluents and reacted with the other intermediate, which may be diluted with a non-aqueous diluent immiscible with one of the diluents for the first intermediate.

With respect to broad method number (2), described above, it is seen that the following variations are included therein, (a) a diamine dissolved or dispersed in water and reacted with a liquid diacid halide, (b) a diamine dissolved or dispersed in water and reacted with a diacid halide dissolve or dispersed in a non-aqueous liquid diluent which is immiscible with water, and (c) a diamine dissolved or dispersed in an emulsion of water and non-aqueous diluent and reacted with a diacid halide, which may be diluted with a water-immiscible diluent.

For purposes of convenience, the polymerization process delineated in the paragraphs directly above shall hereinafter be called interphase polymerization. Furthermore, whenever a reactant is said to be "dispersed" in a diluent, in addition to the more usual meaning which encompasses the suspension of small discrete particles of solid or liquid in a diluent, this expression is intended to include cases in which the reactant is dissolved in a diluent, and "dispersion" is intended to include true solutions. While there is a technical difference between dispersions and true solutions, they are often difficult to distinguish and the two are equivalent in the practice of this invention.

The process for the preparation of polyamides by interphase polymerization can be carried out over a considerable range of temperatures from just above the freezing point of the phase having the highest freezing point up to temperatures at which decomposition products form to an objectionable extent. However, in view of the rapidity with which fiber-forming polyamides are formed at moderate temperatures, there is no advantage in using temperatures higher than 150° C. and it is preferred that the reaction be carried out in the moderate temperature range of −10° C. to +60° C.

It is essential that the solvent or diluent employed for a specific reactant be inert toward it. It is not essential, however, that the solvent or diluent used in one phase be completely inert to the reactant in the other phase. Generally speaking, it is essential that the two reactants be more reactive toward each other than either reactant is to the solvent or diluent of the other phase. If this were not the case, the yield of polyamide would be greatly reduced, or might even be non-existent.

Since the reaction rate of diamines with diacid halides is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided the available diamine and/or the diacid halide is completely used up in a matter of a few seconds or, at most in a matter of a few minutes, depending to an extent on the sum total of the reaction conditions.

Fibers are prepared from polyamides by spinning from a melt. The temperatures commonly employed for the production of melt-spun fibers are in the neighborhood of 200° to 300° C., and this may cause a further polyamidation reaction because the polymer chain still contains terminal amide-forming groups. When this occurs the molecular weight and melt viscosity both increase. Such changes in viscosity and molecular weight may constitute a serious problem in the preparation of uniform filaments. This can be overcome by treating the unstabilized polyamide with a mono-functional reactant, such as a mono-amine of a mono acid halide, and thus block off the remaining amide forming end-groups to form a stabilized polymer. An alternative method is to employ a monofunctional amine or a monofunctional acid chloride as a stabilizer in the polyamide forming reaction of this invention. Small amounts of these monofunctional reactants, for example, from 0.1 to 5 mole percent, will enter into the reaction during the formation of polyamide chains and serve as non-reactive end groups for these chains. Consequently, when such a polymer is subsequently heated for the purposes of melt spinning, neither the molecular weight nor the viscosity will increase, since there are no amide-forming terminal groups in the polyamide. Thus a melt-stable polyamide is obtained which has considerably more utility than the unstabilized material for this particular use.

Surprisingly, contrary to the teachings of the prior art, relatively impure reactants may be employed in the process of this invention. For example, dicarboxylic acids frequently constitute major impurities in diacid halides. These dicarboxylic acids do not react under the conditions employed for the process of this invention and consequently do not enter into the polyamide formation. Instead they remain in the spent reaction liquor and are easily separated from the solid precipitated polyamide. Likewise it has been found that the diamine may be grossly contaminated with a diamine carbonate, an impurity which is difficult to prevent. All manner of impurities which are non-reactive with either of the reactants under the conditions of this polymerization may be present without affecting the constitution or the purity of the resultant polyamide. These impurities will not be a part of the polyamides produced and will either remain in the spent reaction liquor or, should they be insoluble in the diluents employed, they can be readily leached from the polyamide by simply percolating an appropriate solvent through a bed of the collected polyamide. If any impurity is valuable as a starting material for the preparation of a reactant, it can be recovered from the spent liquor and then be converted to the reactant for use in the process. In this way the efficiency of the over-all reaction can be improved for impure reactants and the cost of the final product correspondingly reduced. Monofunctional reactants of the type described above which serve as stabilizers are of course not to be considered among the classes of impurities which can be tolerated in large amounts.

Another surprising feature of this invention which is contrary to the teachings of the prior art is that the reactants do not need to be employed in equivalent proportions. The excess of one reactant simply remains in the supernatant liquid from which the polyamides precipitate. It has been found that the process of interphase polymerization of diamines with diacid halides yields polyamides of high molecular weight whether one reactant is in excess by 300% or even more, or whether the reactants are in equivalent or nearly equivalent amounts. For purposes of economy, it is usually desirable to employ the reactants in equivalent or nearly equivalent amounts.

The concentration of the reactants in the separate liquid phases can vary over wide limits and still produce high molecular weight polyamides. As shown in the examples, either reactant, but not both, may be employed in 100% concentration as the pure compound. Likewise, either reactant may be employed in a very low concentration in its separate liquid phase, for example, concentrations as low as 0.1% or even lower are useful.

It is sometimes advantageous to employ an emulsifying agent to assist in suspending one liquid phase in the other. To this end, water or organic soluble emulsifying agents may be used. Examples of organic soluble agents are the "Spans" (Atlas Powder Co., sorbitan mono fatty acid esters), the higher fatty alcohols, the higher fatty alcohol esters, "Naccolene F" (Allied Chem. & Dye Co., alkyl aryl sulfonate) "Acto 700" (Stanco Inc., sodium petroleum sulfonate), "Alkaterge C" (Commercial Solvents Corp. substituted oxazoline), "Betanols" (Beacon Co. high molecular weight esters), "Duponol OS" (Du Pont Co., higher alcohol derivative) etc.

Where one phase is aqueous, the emulsifying agents may be cationic, anionic or non-anionic. Representative examples of cationic emulsifying agents are "Lorol" pyridinium chloride ("Lorol" is the trade name for the mixture of aliphatic alcohols obtained by hydrogenation of coconut oil), "Triton K–60" (Rohm & Haas Co., cetyl dimethyl benzyl ammonium chloride) "Nopcogen 17L" (Nopco Chem. Co., a hydroxylated polyamide). Representative examples of non-ionic agents are the "Tweens" (Atlas Powder Co., Polyoxyethylene derivatives of sorbitan monoesters of long-chain fatty acids), "Triton N–100" (Rohm & Haas Co., alkylated aryl polyether alcohol), the "Elvanols" (Du Pont Co. partially hydrolyzed polyvinyl acetates of various molecular weights), etc. and representative examples of the anionic emulsifying agents are soaps, the amine salts, "Duponal WA" (Du Pont Co., alcohol sulfate), "Aerosol OT" (American Cyanamid Co., dioctyl ester of sodium sulfosuccinic acid), "Aresklene 400" (Monsanto Chemical Co., dibutyl phenol sodium disulfonate) "MP–189S" (Du Pont Co., hydrocarbon sulfonate), etc.

It is likewise desirable to use an acid acceptor for the hydrogen halide which is liberated in the course of the reaction of the organic primary or secondary diamine with the organic dicarboxylic acid halide. The diamine itself can serve as the acid acceptor by forming the amine salt. Since the amine salt is incapable of reacting with the diacid halide, it is desirable in this instance to start with at least 2 equivalents of diamine for every equivalent of diacid halide to ensure that all the diacid halide is used up. To circumvent the necessity for using this large excess of diamine, it is necessary merely to add an acid acceptor, preferably to the liquid phase containing the diamine. When the amount of added acid acceptor is equivalent to the amount of liberated hydrogen halide, none of the diamine will be rendered unreactive. Larger amounts or lesser amounts of the added acid acceptor may be employed. The added acid acceptor may range from zero up to an amount equivalent to 15 times the diamine present or even more. Preferably, the added acid acceptor, if one is use, will be in the range of 1 to 3 times the amount equivalent to the diamine present. To be effective, the added acid acceptor must be a stronger base than the diamine contained in the same liquid phase so that the hydrogen halide preferentially reacts with the added acid acceptor. Depending on the basicity of the diamine the added acid acceptor may be caustic alkali, an alkali carbonate or other salt of a strong base and a weak acid or a tertiary organic base.

These basic materials may be added directly to one of the liquid phases or sometimes to both the liquid phases either before or during the course of the reaction. Or, if these basic materials are not added at this stage, they may be added to the spent reaction liquor as a means of reforming the diamine from the diamine hydrohalide, so that the diamine may be put through the reaction again. As can be seen in the examples hereinafter set forth, the liquid phase containing the diamine can be strongly alkaline and still not prevent the preferential reaction of the diacid halide with the diamine.

It is sometimes desirable to load the solvent for the respective reactants with non-reactive solutes so as to produce, for example, a better yield, or a higher molecular weight, or a more useful polyamide. Such non-reactive substances may be salts such as sodium chloride, potassium bromide, lithium sulphate and the like for loading the aqueous phase.

Copolyamides are prepared by substantially the same procedure as homopolyamides by the process of this invention. Where the reactants are one diamine and one diacid halide, a homopolyamide results. Where the reactants are two or more diamines and one diacid halide or two or more diacid halides and one diamine or two or more diacid halides and two or more diamines, copolyamides are produced having compositions which depend on the ratios and reactivities of the intermediates.

The following examples illustrate preferred methods of practicing the invention and the effect of variations of operating conditions on the products obtained and the yields, but are not to be construed as limiting the scope of the invention. In these examples the inherent viscosity values of the products are given as an indication of the degree of polymerization obtained. In view of the relative ease with which these values are determined, they provide a useful method of evaluating the effect of process variables on a given type of polymerization. The values may be misleading when used to compare different types of polyamides but, in general, those having values of at least about 0.3 were spinnable. In determining these values, viscosimeter flow times were obtained at 25.0°±0.1° C. for a solvent of the polyamide and for a solution of the polyamide in the solvent at a concentration of 0.5 gram per 100 cubic centimeters of solution. The inherent viscosity value was then calculated as 2 times the natural logarithm of the relative viscosity of the solution compared to that of the pure solvent.

EXAMPLE 1

The apparatus shown in the drawing was used for continuous preparation of polyhexamethylene adipamide by the process of this invention. This apparatus comprised a 1500 cc. glass reaction vessel 10 provided with an agitator comprising three-bladed propellers 11, 12 and 13 mounted on shaft 14 driven by motor 15. These propellors were located near the top, middle and bottom, respectively, of the vessel. The reactants were added in separate solutions at the top of the vessel directly above propellor 11 through pipes 16 and 17. A slurry of polymer and liquid was withdrawn from the bottom of the vessel through pipe 20, was passed upward through pipe 21, and part of the slurry was recirculated to the top of vessel 10 through pipe 22. The remainder of the slurry was withdrawn through overflow pipe 23 and filtered to recover the polymer. The slurry was cooled during passage through pipe 21 by cooling jacket 25.

A continuous stream of adipyl chloride solution in benzene was supplied through pipe 16 and a continuous stream of hexamethylenediamine solution in aqueous alkali was supplied through pipe 17. The adipyl chloride solution was 10% by weight in benzene and was introduced at the rate of 280 cc. per minute. The hexamethylenediamine solution was 2.3% by weight in water, contained 1.7% by weight of sodium hydroxide, and was introduced at the rate of 730 cc. per minute. The agitator was rotated at a rate sufficiently rapid to produce good mixing between the two entering streams of reactants and to provide adequate recirculation in the circular path of the reaction vessel, as well as to keep the precipitated polyamide in suspension so as to be carried off at the overflow. The solid white polyhexamethylene adipamide was collected at the outlet at the rate of 140 g. per hour, and was separated from the supernatant liquid by filtration, washed with water, with methanol and dried to yield a polymer having an inherent viscosity in m-cresol of 1.06.

This polymer was melt-spun from a melt pool at 270° C. into a 5-filament yarn of 115 denier. This yarn was hot drawn 530% at 110° C. to give a strong uniform yarn of 22 denier. The yarn properties were 4.2 g. per denier and 12% break elongation. The initial modulus was 29 g. per denier.

EXAMPLE 2

In a one-liter flask equipped with a high speed stirrer was placed 150 g. of water, 7.53 g. of a 79% aqueous solution of hexamethylenediamine, and 4.2 g. of sodium hydroxide. Undiluted adipyl chloride was added to this solution with vigorous agitation over a period of 10 minutes while maintaining the reaction mixture at 20° C. The resulting precipitate of polyhexamethylene adipamide was filtered off, washed three times with water and twice with acetone and then dried. The resulting product gave an inherent viscosity of 1.07 in metacresol and was melt spinnable. The polymer was pressed into a film at 255° C. to give a transparent, strong and pliable, self-sustaining film. This film could be hot-drawn 300% at 160° C. X-ray examination of the drawn film showed a strongly oriented structure.

The polyamide was wet-spun from a 25% solution in formic acid into a 40% solution of sodium hydroxide. Yarns containing 30 filaments were readily obtained, and these could be cold-drawn immediately after spinning. The inherent viscosity obtained by dissolving the yarn in metacresol was 1.10. These yarns could also be hot-drawn in oil at 150° C. to give a tenacity of 2.5 g. per denier and a break elongation of 25%.

EXAMPLE 3

In a one-liter flask equipped with a high speed stirrer 150 g. of water, 1.5 g. "Duponol ME" (an alcohol sulfate anionic emulsifying agent made by E. I. du Pont de Nemours & Co.), 7.53 g. of a 79% aqueous solution of hexamethylenediamine, 4.2 g. sodium hydroxide and 130 g. of benzene were mixed to form an emulsion. The mixture was cooled to 5° C. in an ice salt bath and then a solution of 9.15 g. adipyl chloride in 18 g. benzene was added to the emulsion over a period of about 15 minutes while maintaining the temperature at 5° C. After completion of the addition of the acid chloride, the mixture of the precipitated polyamide and the residual solution was stirred for another 15 minutes as a matter of convenience before being filtered. The solid polyamide was washed three times with water and twice with acetone and then dried. The polyhexamethylene adipamide had an inherent viscosity of 1.26 in metacresol solution. The polymer was melt-spun into a monofil which could be cold-drawn 400% to give a 95 denier monofil having a tenacity of 3.2 g. per denier.

EXAMPLE 4

Example 3 has illustrated a type of liquid phase condensation polymerization in which one of the intermediates is added to a preformed two phase liquid system containing the other intermediate. Specifically, a solution of adipyl chloride in benzene was added to an emulsion of benzene and an aqueous alkaline solution of hexamethylenediamine. Since the hexamethylenediamine is also somewhat soluble in benzene, one might wonder why there should be any difference in result from a simple single phase solution polymerization. The mechanism of the reaction is not yet understood, but the facts reveal an astonishing difference in result.

In the following series of experiments identical conditions were maintained except as noted. In each case a solution of 2.9 g. (0.025 mole) of hexamethylenediamine and 5.3 g. (0.050 mole) of sodium carbonate in 150 cc. of the indicated diluent was placed in a one-liter flask equipped with a high speed stirrer. To this was added at room temperature over a ten-minute period, while stirring vigorously, a solution of 4.6 g. (0.025 mole) of adipyl chloride in 150 cc. of the indicated diluent. The resulting precipitate was collected by filtration, washed and dried. Table I compares the results obtained when using miscible diluents which provide a single-phase system with results obtained with a two-phase system of immiscible diluents.

Table I.—Comparison of single phase polymerization with two-phase interphase polymerization

| Diluent for Diamine | Diluent for Adipyl Chloride | No. of Phases | Percent Yield of Polyamide | Inherent Viscosity of Polyamide in m-cresol |
|---|---|---|---|---|
| Toluene | Xylene | 1 | 30 | 0.23 |
| Water | do | 2 | 60 | 1.19 |
| Toluene | Ether | 1 | 28 | 0.12 |
| Water | do | 2 | 53 | 0.77 |

EXAMPLE 5

A wide range of temperatures can be used in the condensation polymerization with little change in the polyamide produced. The following example will illustrate the production of polyhexamethylene adipamide at the extremely low temperature of −40° C., just above the freezing point of the system used, and at the boiling point of a comparable system, with essentially no difference in the quality of polyamide produced.

A stainless steel reaction vessel fitted with a high speed stirrer and equipped with cooling coils on the outside walls of the vessel was used in this example. In the vessel were placed 75 g. water, 75 g. ethylene glycol, 4.2 g. sodium hydroxide and 7.53 g. of a 79% aqueous solution of hexamethylene diamine. By circulating a coolant through the cooling coil the temperature was reduced to −40° C. Over a period of 30 seconds a solution of 9.15 g. adipyl chloride in 150 g. xylene was added to this with agitation. The mixture was stirred an additional half hour, as a matter of convenience, while maintaining the temperature at −40° C. A solid precipitate of polyhexamethylene adipamide was formed, which was filtered off, washed with water then washed with acetone and dried. The product gave an inherent viscosity of 0.70 in metacresol and could be melt spun.

A solution of 5.8 g. of hexamethylenediamine and 4.2 g. of sodium hydroxide in 150 g. of water was heated to boiling. To this was added, over a period of 3 minutes while maintaining the system at a boil, a solution of 9.15 g. of adipyl chloride in 188 g. of chlorobenzene. The reaction mixture was immediately poured into water and the polyamide was recovered as above. The inherent viscosity of the product in metacresol was 0.66.

EXAMPLE 6

In the previous examples either sodium hydroxide or sodium carbonate was used as an acid acceptor to combine with hydrogen chloride liberated in the condensation polymerization. This added acid acceptor can be dispensed with, since the diamine can function as an acid acceptor for the reaction, but a considerable excess of diamine must be provided for this purpose or the yield will be adversely affected. This is shown by the following example, in which the concentration of the diamine was varied while keeping the other conditions constant.

The amount of hexamethylenediamine present to react with a given amount of adipyl chloride in these emulsion polymerization reactions was in the molal proportions of 1:1, 2:1 and 4:1. The reactions were accomplished by dissolving the hexamethylenediamine in 100 g. water, cooling to 0° C. in a Waring Blendor with agitation, and adding 4.57 g. (0.025 mole) adipyl chloride dissolved in 87 g. of xylene over a period of about 5 minutes while continuing agitation. The resulting solid white polyhexamethylene adipamide was filtered off, washed with water, washed with acetone and dried. The yield of polyamide based on the amount of adipyl chloride used, and the inherent viscosity of the polyamide resulting from this reaction for the three amounts of diamine used are given in Table II.

Table II.—Effect of omitting acid acceptor

| Amount of Hexamethylenediamine Dissolved in the Water Phase | Percent Yield of Polyamide | Inherent Viscosity of Polyamide in m-cresol |
|---|---|---|
| 2.9 g. (0.025 mole) | 26 | 1.50 |
| 5.8 g. (0.050 mole) | 66 | 1.28 |
| 11.6 g. (0.100 mole) | 76 | 0.78 |

EXAMPLE 7

The following example illustrates that the interphase polymerization reaction can be carried out in the presence of a high concentration of an alkali hydroxide in the aqueous phase. 30 g. sodium hydroxide was dissolved in 100 g. of water and 2.9 g. (0.025 mole) hexamethylenediamine was stirred in, using a Waring Blendor. On cooling to 0° C. with agitation, it was noted that some of the diamine separated as very fine droplets. Next was added 4.57 g. adipyl chloride in 44 g. of xylene over a period of about 8 minutes while continuing the vigorous agitation. The solid white precipitated polyhexamethylene adipamide was filtered off after adding 250 g. of water to facilitate this procedure. The yield was 65% and the polyamide gave an inherent viscosity in m-cresol of 0.66.

EXAMPLE 8

The following example depicts the results obtained with various alkaline materials as added acid acceptors in the interphase polymerization reaction. 2.9 g. (0.025 mole) hexamethylenediamine was dissolved in 150 g. of water in a Waring Blendor with agitation and cooled to 0° C. Then was added with continued agitation 4.57 g. adipyl chloride dissolved in 130 g. xylene over about a 5 minute period. The resulting precipitate of solid white polyhexamethylene adipamide was filtered off, washed with water, washed with acetone and dried. The same reaction was carried out with the addition of various alkaline materials to the aqueous solution before the cooling step was undertaken. The yield of polyamide, based on the amount of adipyl chloride used, and the inherent viscosities of the products obtained are given in Table III.

Table III.—Effect of various alkaline materials

| Alkaline Material Added to Aqueous Phase | Percent Yield of Polyamide | Inherent Viscosity of Polyamide in m-cresol |
|---|---|---|
| None Added | 34 | 1.20 |
| 3.3 g. (0.05 mole) of 85% KOH | 73 | 1.16 |
| 6.9 g. (0.05 mole) of K₂CO₃ | 60 | 1.19 |
| 4.2 g. (0.05 mole) of NaHCO₃ | 21 | 0.69 |
| 6.8 g. (0.05 mole) of NaOAc.3H₂O | 35 | 1.26 |
| 4 g. (0.05 mole) of pyridine | 21 | 0.35 |

EXAMPLE 9

The previous examples have illustrated the formation of spinnable polyamides from hexamethylenediamine and adipyl chloride. Spinnable polyamides can be prepared in a similar manner from hexamethylenediamine and sebacyl chloride, as shown by the next group of examples. Into a one-liter flask equipped with a high speed stirrer were put 150 g. of water, 1.5 g. of "Nopcogen 17L" (a hydroxylated polyamide of a cationic nature manufactured by the Nopco Chemical Company), 7.35 g. of a 79% aqueous solution of hexamethylenediamine and 12.0 g. of potassium hydroxide. This mixture was heated at 50° C. with vigorous agitation and then a solution of 24 g. of sebacyl chloride in 160 g. of cyclohexane was added to it slowly. The sebacyl chloride solution was added over a period of 20 minutes, maintaining the emulsion temperature at 50° C. Stirring was continued for another 10 minutes as a matter of convenience and the solid precipitated polyhexamethylene sebacamide was filtered off, washed three times with water, twice with acetone, and dried. This polyamide gave an inherent viscosity of 0.87 in metacresol. Continuous filaments were prepared from the polymer by melt spinning.

EXAMPLE 10

The following example depicts the variation in molecular weight as measured by the inherent viscosity in m-cresol of polyhexamethylene sebacamide which results from changing the concentration of the reactants. The polyamidation reaction in this case was performed by pouring the solution of sebacyl chloride dissolved in carbon tetrachloride into a 100 cc. beaker. The aqueous diamine solution containing an equivalent quantity of sodium hydroxide was then carefully poured on top of the acid chloride solution so as to form two layers. A reaction immediately occurred at the interface to form a film of polyhexamethylene sebacamide which was then removed, washed in water, washed in acetone and dried for purposes of determining the inherent viscosity in m-cresol. In Table IV are given the inherent viscosities for the film derived at the interface of the two reactant solutions of the given concentrations:

Table IV.—Inherent viscosity of polyhexamethylene sebacamide vs. concentration of reactants

| Concentration in Aqueous Solution of Hexamethylene-diamine (HMD) and Sodium Hydroxide in Moles Per Liter | | Inherent Viscosity for Various Concentrations of Sebacyl Chloride in Carbon Tetrachloride by Volume Percent | | | | | | |
|---|---|---|---|---|---|---|---|---|
| HMD | NaOH | 0.5% | 1.25% | 2.5% | 5.0% | 10.0% | 20.0% | 40.0% |
| 1.36 | 2.72 | ---- | ---- | 0.46 | 1.24 | 1.16 | 1.12 | 1.05 |
| 0.78 | 1.56 | 0.33 | 1.14 | 1.37 | 1.19 | 1.15 | 1.12 | 0.97 |
| 0.39 | 0.78 | 1.27 | 1.42 | 1.22 | 1.18 | 1.16 | 1.00 | ---- |

It is seen that the inherent viscosity of the polyamide varies somewhat with the reaction conditions. It is apparent that a change in the concentration of the reactant in one solution required a change in the concentration of the other reactant in its solution to obtain a polyamide with a similarly high viscosity.

EXAMPLE 11

This example depicts the effect on the molecular weight as measured by the inherent viscosity, brought about by changing the diluent for the acid chloride. This series of experiments was carried out as described in the previous example using an aqueous solution containing 1.36 mole of hexamethylenediamine per liter plus 2.72 mole of sodium hydroxide per liter and 5% by volume of sebacyl chloride dissolved in the solvent indicated in the table below. Since some of these solutions had a lower specific gravity than the aqueous alkaline diamine solution, it was necessary to put the diamine solution on the bottom and float the acid chloride solution on the top. The polyamide film achieved at the interface in every case was taken out, washed and dried as described in the previous example and measured for inherent viscosity in a m-cresol solution. The inherent viscosities obtained for the various solvents for the acid chloride are given in Table V.

Table V.—Inherent viscosity of polyhexamethylene sebacamide vs. the diluent for the sebacyl chloride

| Diluent | Inherent Viscosity in m-cresol |
|---|---|
| Carbon Tetrachloride | 1.24 |
| 1-Bromo-2-Chloroethane | 1.23 |
| Chlorobenzene | 1.23 |
| Xylene | 1.11 |
| Nitrobenzene | 1.04 |
| Ethyl Ether | .85 |
| Heptane | .76 |
| Isooctane | .73 |

EXAMPLE 12

The previous examples have illustrated the use of various water-immiscible diluents for the organic dicarboxylic acid halide, but water has been used in the organic diamine phase in each case. Non-aqueous immiscible diluents can also be used in both phases with good results.

A solution of 0.56 g. sebacyl chloride in 6.2 g. of carbon tetrachloride was placed in a 25 cc. glass beaker. To this solution was added with stirring at room temperature a solution of 0.2 g. of hexamethylenediamine in 5.6 g. of ethylene glycol. The resulting solid precipitate of polyhexamethylene sebacamide was filtered off, washed with water, washed with acetone and dried. The polyamide had an inherent viscosity of 0.86 in metacresol.

EXAMPLE 13

The previous examples have illustrated the formation of polyamides with hexamethylenediamine. Similar results are obtained with diamines which have an ether linkage in the chain, as shown by the following example, which also further illustrates the use of non-aqueous diluents in both phases:

A solution of 0.77 g. of bis-aminopropyl ether in 26 g. of tetramethylenesulfone was poured into a 25 cc. glass beaker. A solution of 2.24 g. sebacyl chloride dissolved in 17 g. of isooctane was added at room temperature to the solution in the beaker. The two-phase system was stirred slowly and a rapid reaction took place with the evolution of heat. The resulting polymer absorbed one of the phases, presumably the tetramethylenesulfone, giving a pasty mass. This was poured into alcohol and the polymer was filtered off, washed with water, washed with acetone and dried. The polyamide had an inherent viscosity of 0.43 in metacresol.

EXAMPLE 14

The diluent can be omitted from the diamine phase of Example 13 with no significant difference in the polymer obtained. A solution of 0.56 g. of sebacyl chloride in 7.3 g. of isooctane was cooled to 0° C. and added to 4.8 g. of undiluted bis-aminopropyl ether in a 25 cc. beaker. The resulting polyamide was filtered off, washed with water, washed with acetone and dried. The inherent viscosity of the polyamide was 0.40 in metacresol.

EXAMPLE 15

Spinnable polyamides can be produced with reactants of short chain length. In a Waring Blendor were placed 2.9 g. (0.025 mole) of hexamethylenediamine, 2.1 g. of sodium hydroxide and 150 g. of water. This was cooled to 0° C. A solution of 3.2 g. (0.025 mole) of oxalyl chloride in 130 g. of toluene was added in a steady stream in a period of about 2 minutes with agitation, pieces of ice being added at intervals to keep the temperature at 0° C. The solid polyamide formed was separated by filtration and washed with water, acetone and methanol in turn. A 38% yield of polyamide was obtained which had an inherent viscosity of 0.38 in sulfuric acid. The product could be spun from melt.

EXAMPLE 16

A wide variety of polyamides containing aromatic and/or other cyclic groups can be prepared by the process of this invention. Terephthalamides were prepared from each of the diamines listed below through an interphase reaction with terephthaloyl chloride. The procedure was to dissolve 0.05 mole of the respective diamine, 4.2 g. sodium hydroxide and 1.0 g. "Duponol WA" in 100 g. water and cool this to 0° C. with agitation in a Waring Blendor. Next was added with continued agitation a solution composed of 10.15 g. (0.05 mole) terephthaloyl chloride in 88 g. benzene over a period of about ½ minute. The polyamide precipitated at once and required the addition of more water to keep the mixture fluid. The solid was then filtered off, washed with water, with acetone, with methanol and finally dried. The respective products had inherent viscosities, determined in sulfuric acid solution, as indicated in Table VI.

Table VI.—Polyamides prepared with terephthaloyl chloride

| Diamine Reactant | Yield, Percent | Inherent Viscosity | Melting Point, °C. |
| --- | --- | --- | --- |
| Hexamethylenediamine | 100 | 0.38 | Above 350. |
| Ethylenediamine | 100 | 0.30 | Above 350. |
| Benzidine | 90 | 0.28 | Above 350. |
| Piperazine | 100 | 0.45 | Above 350. |
| 3,6-diaminodurene | 90 | 0.28 | Above 350. |

The following example illustrates the preparation of an additional terephthalamide, using somewhat different conditions:

EXAMPLE 17

Into a one-liter flask equipped with a high speed stirrer were put 125 g. water, 7.1 g. 2,5-dimethylhexamethylenediamine and 4.2 g. sodium hydroxide. The temperature was raised to 40° C. and maintained thereby cooling as required when the 10.2 g. of terephthaloyl chloride in 150 g. chlorobenzene was added over a period of 5 minutes with agitation. The emulsion was stirred an additional 10 minutes as a matter of convenience before filtering off the solid precipitate of poly-2,5-dimethylhexamethylene terephthalamide. The product was washed with water, then with acetone and dried. It gave an inherent viscosity in metacresol of 0.28.

EXAMPLE 18

This example illustrates the preparation of a polyamide containing alicyclic groups. A stainless steel reaction vessel fitted with a high speed stirrer and equipped with cooling coils on the outside walls of the vessel was used. To this vessel with agitation was added 200 g. of water, 2 g. of "Tween 20" (polyethylene oxide derivative of sorbitan monolaurate, a non-ionic emulsifying agent made by Atlas Powder Co.) and 21.3 g. of hexahydroparaxylylene diamine. To this emulsion, with vigorous agitation, was added a solution of 9.15 g. adipyl chloride in 190 g. of benzene over a period of two minutes. The temperature of the reacting solution was kept at 10° C. during the period of adding acid chloride and for another 15 minutes thereafter as a matter of convenience during which stirring was continued. The solid polyhexahydroparaxylylene adipamide which precipitated was filtered off, washed with water, with acetone and dried. The dried product gave an inherent viscosity in metacresol of 0.99.

EXAMPLE 19

Copolymers can be prepared readily by using more than one organic diamine and/or organic dicarboxylic acid halide in the process of this invention. Into a Waring Blendor were put 150 g. of water, 1 g. "MP-189" (a hydrocarbon sulfonate anionic emulsifying agent manufactured by E. I. du Pont de Nemours & Co.), 4.2 g. sodium hydroxide, 0.43 g. of bis-(N-aminoethyl) piperazine and 5.5 g. of hexamethylenediamine in 25 g. of water and agitation was begun. To this mixture was added, with continued agitation, a solution of 9.15 g. adipyl chloride in 175 g. benzene. The acid chloride solution was added to the emulsified mixture over a period of 30 to 60 seconds; stirring was continued for 2 minutes; and then the solid precipitated copolymer was filtered off. The solid was washed with 200 ml. of hot benzene, twice with 200 g. portions of water and once again with 175 g. portion of hot benzene before being dried at 100° C. The copolymer had a sticking point of 240° C. and an inherent viscosity in metacresol of 0.84. The polymer was manually melt spinnable.

EXAMPLE 20

Heterogeneous, aqueous polyamide dispersions may be prepared by the process of this invention. Such dispersions are useful for applying coatings, but polyamide dispersons have been difficult to prepare, requiring complicated manipulative procedures. In a 750 cc. Erlenmeyer flask were placed 150 g. of water and 1.5 g. of "Duponol WA," an alcohol sulfate anionic emulsifying agent made by E. I. du Pont de Nemour & Co. This was shaken and cooled to 0° C. To this was added 5.2 g. of piperazine dissolved in 25 g. of water and 4.9 g. of sodium hydroxide dissolved in 25 g. water. The mixture was swirled vigorously and a solution of 11 g. of adipyl chloride in 150 g. of benzene was added over a period of 45 seconds. The contents of the flask were allowed to warm to room temperature in about 30 minutes. A dispersion of the polyamide resulted.

The emulsion was broken and the solid polyamide precipitated by adding a saturated sodium chloride solution acidified with hydrochloric acid. The precipitated solid was collected, washed with water and dried to yield 9.5 g. of white polyamide. This had a melting point of about 355° C. and an inherent viscosity in sulfuric acid of 0.41.

EXAMPLE 21

An inactive emulsion of organic diamine, organic dicarboxylic acid halide and diluent can be prepared by first neutralizing the diamine with an acid. This inactive emulsion can then be activated by adding an acid acceptor to free the diamine when it is desired to produce polyamide. A solution of 5.8 g. (.05 mole) of hexamethylenediamine in 100 g. of water was neutralized with 0.1 mole hydrochloric acid to form the diamine dihydrochloride. This solution was introduced into a Waring Blendor and the temperature reduced to 0° C. Then 10.15 g. (0.05 mole) terephthaloyl chloride dissolved in 44 g. xylene was added with agitation to the aqueous solution of the diamine dihydrochloride. No reaction occurred as evidenced by the lack of the formation of any precipitate.

Under continued agitation a solution of 10 g. of sodium hydroxide dissolved in 50 g. of water was added over a period of about 7 minutes and a white precipitate of polyhexamethylene terephthalamide resulted at once. The mixture became thick, so an additional 200 g. of water was added before filtering. The collected solid was washed with water, with acetone, with benzene and then dried to give a 28% yield. The inherent viscosity in sulfuric acid was 0.36.

The advantages of the interphase polymerization process for polyamides over the methods previously described in the prior art are many and varied. By the method of this invention, polyamides which decompose at temperatures below their melting point may be easily and simply prepared with essentially no degradation products. Likewise, those polyamides which are normally prepared from reactants that decompose at the temperature normally employed may be produced simply and easily by the process of this invention. It is further seen that complicated or high strength equipment is not necessary for the process of this invention since the reaction is carried out preferably in the range including room temperature under atmospheric pressure. Additional advantages for this invention are that it is not necessary to employ high purity reactants to obtain a satisfactorily pure and high molecular weight polyamide and it is not necessary to maintain an exact equivalence of the reactants in the reacting mixture.

Importantly, the process of this invention for the production of polyamides yields the final product in an extremely short period of time after the reaction is initiated. As a result an enormous productivity can be achieved from relatively simple equipment occupying only a relatively small amount of floor space. Still another advantage is that the polyamide of this invention are obtained in a finely divided or granular state, which is easily dissolved for the purposes of wet spinning or dry spinning, and which is readily melted for the melt-spinning process disclosed for the polyamides of the prior art.

Another and important advantage of this invention is that it can be practiced in a continuous fashion. The streams of the two reactant liquids can be brought together as described in Example 1, or the same end can be accomplished in many other ways. For example, the streams of the two liquid reactants may be made to impinge upon each other at a high velocity so as to form an emulsion of fine droplet size. This emulsion need exist only for the very short time in which the reaction takes place. The resulting polyamide may then be separated from the spent reaction liquors. The advantages attributable to continuous processes are well appreciated in the chemical field.

Another important advantage of the invention is that polyamide dispersions can be prepared directly from the reactants, as illustrated in Example 20. The dispersions can be used as prepared in the stable dispersed state in coating applications, or the dispersions can be broken when desired.

The polyamides produced by the process of this invention have utility in many and varied fields. They may serve as ingredients of coating compositions, they may be molded into useful plastic articles, they may be used for the production of fibers, filaments and films, and in general, they possess all the utility of the polyamides prepared by the methods of the prior art.

As many different embodiments of the present invention may be made without departing from the spirit and scope thereof, it is to be understood that the invention is not limited to the specific embodiments disclosed except to the extent defined in the appended claims.

What is claimed is:

1. A process for preparing a polyamide which comprises bringing together, as essentially the sole polymerforming reactants, organic diamine in one liquid phase and organic dicarboxylic acid halide in a second liquid phase immiscible with the first phase, mixing the liquid phases to form a system comprised of two liquid phases such that diamine and acid halide are in separate phases and at least one of the phases includes a liquid diluent, and maintaining the phases in admixture, in the presence of an acid acceptor, until an interphase condensation polymerization has taken place with formation of a spinnable polyamide.

2. A process for preparing a polyamide which comprises mixing, as essentially the sole polymerforming reactants, liquid organic dicarboxylic acid halide and organic diamine dispersed in liquid inert diluent in which the acid halide is substantially insoluble, and maintaining the phases in admixture, in the presence of an acid acceptor, until an intrephase condensation polymerization has taken place with formation of a spinnable polyamide.

3. A process for preparing a polyamide which comprises mixing, as essentially the sole polymerforming reactants, liquid organic diamine and organic dicarboxylic acid halide dispersed in liquid inert diluent in which the diamine is substantially insoluble, and maintaining the phases in admixture, in the presence of an acid acceptor, until an interphase condensation polymerization has taken place with formation of a spinnable polyamide.

4. A process for preparing a polyamide which comprises mixing, as essentially the sole polymerforming reactants, organic diamine dispersed in liquid inert diluent and organic dicarboxylic acid halide dispersed in a second inert diluent which is immiscible with the first diluent, and maintaining the phases in admixture, in the presence of an acid acceptor, until an interphase condensation polymerization has taken place with formation of a spinnable polyamide.

5. A process for preparing a polyamide which comprises mixing, as essentially the sole polymerforming reactants, liquid organic diamine and a two phase system comprising organic dicarboxylic acid halide dispersed in an emulsion of immiscible diluents, and maintaining the phases in admixture, in the presence of an acid acceptor, until an interphase condensation polymerization has taken place with formation of a spinnable polyamide.

6. A process for preparing a polyamide which comprises mixing, as essentially the sole polymerforming reactants, liquid organic dicarboxylic acid halide and a liquid phase comprising organic diamine dispersed in water, and maintaining the phases in admixture, in the presence of an acid acceptor, until an interphase condensation polymerization has taken place with formation of a spinnable polyamide.

7. A process for preparing a polyamide which comprises mixing, as essentially the sole polymerforming reactants, organic dicarboxylic acid halide dispersed in water-immiscible inert diluent and organic diamine dispersed in water, and maintaining the phases in admixture, in the presence of an acid acceptor, until an interphase condensation polymerization has taken place with formation of a spinnable polyamide.

8. A process for preparing a polyamide which comprises mixing, as essentially the sole polymerforming reactants, liquid organic dicarboxylic acid halide and a two-phase system comprising organic diamine dispersed in an emulsion of water and water-immiscible diluent, and maintaining the phases in admixture, in the presence of an acid acceptor, until an interphase condensation polymerization has taken place with formation of a spinnable polyamide.

9. The process of claim 7 wherein the acid halide is terephthaloyl chloride.

10. A process for preparing a polyamide which comprises mixing, as essentially the sole polymer-forming reactants, terephthaloyl chloride dispersed in benzene and ethylene diamine dispersed in water, and maintaining the phases in admixture, in the presence of acid acceptor, until an interphase condensation polymerization has taken place with formation of a spinnable polyamide.

11. A process for preparing a polyamide which comprises mixing, as essentially the sole polymer-forming reactants, terephthaloyl chloride dispersed in benzene and hexamethylene diamine dispersed in water, and maintaining the phases in admixture, in the presence of an acid acceptor, until an interphase condensation polymerization has taken place with formation of a spinnable polyamide.

12. A process for preparing a polyamide which comprises mixing, as essentially the sole polymer-forming reactants, terephthaloyl chloride dispersed in benzene and piperazine dispersed in water, and maintaining the phases in admixture, in the presence of an acid acceptor, until an interphase condensation polymerization has taken place with formation of a spinnable polyamide.

13. A process for preparing a polyamide which comprises mixing, as essentially the sole polymer-forming reactants, adipyl chloride dispersed in xylene and hexamethylene diamine dispersed in water, and maintaining the phases in admixture, in the presence of an acid acceptor, until an interphase condensation polymerization has taken place with formation of a spinnable polyamide.

14. A process for preparing a polyamide which comprises mixing, as essentially the sole polymer-forming reactants, oxalyl chloride dispersed in toluene and hexamethylene diamine dispersed in water, and maintaining the phases in admixture, in the presence of an acid acceptor, until an interphase condensation polymerization has taken place with formation of a spinnable polyamide.

References Cited in the file of this patent

UNITED STATES PATENTS

| | | |
|---|---|---|
| 2,130,523 | Carothers | Sept. 20, 1938 |

FOREIGN PATENTS

| | | |
|---|---|---|
| 892,361 | France | Jan. 7, 1944 |
| 895,395 | France | Apr. 31, 1944 |

OTHER REFERENCES

De Bell et al.: German Plastics Practice, 1948, pp. 283, 284, 289 and 290. (Copy in Div. 50.).